(12) United States Patent
Chandrasekaran et al.

(10) Patent No.: US 8,578,083 B2
(45) Date of Patent: Nov. 5, 2013

(54) BLOCK MAP BASED I/O OPTIMIZATION FOR STORAGE VIRTUAL APPLIANCES

(75) Inventors: Karthik Chandrasekaran, Bangalore (IN); Supratim Deka, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 532 days.

(21) Appl. No.: 12/577,637

(22) Filed: Oct. 12, 2009

(65) Prior Publication Data

US 2010/0228903 A1 Sep. 9, 2010

Related U.S. Application Data

(63) Continuation-in-part of application No. 12/397,117, filed on Mar. 3, 2009.

(51) Int. Cl.
*G06F 12/00* (2006.01)

(52) U.S. Cl.
USPC ............................................................ 711/6

(58) Field of Classification Search
None
See application file for complete search history.

(56) References Cited

U.S. PATENT DOCUMENTS

| 7,433,948 | B2 | 10/2008 | Edsall et al. | |
| 8,073,674 | B2 | 12/2011 | Gehr et al. | |
| 2006/0168286 | A1 | 7/2006 | Makhervaks et al. | |
| 2007/0061492 | A1 | 3/2007 | van Riel | |
| 2008/0091891 | A1* | 4/2008 | Shiota et al. | 711/154 |
| 2009/0313446 | A1* | 12/2009 | Schuba et al. | 711/162 |
| 2009/0328073 | A1 | 12/2009 | Tripathi | |
| 2010/0017802 | A1 | 1/2010 | Lojewski | |
| 2010/0161922 | A1* | 6/2010 | Sharp et al. | 711/162 |
| 2010/0228934 | A1 | 9/2010 | Chandrasekaran | |
| 2011/0010483 | A1* | 1/2011 | Liljeberg | 711/6 |

* cited by examiner

*Primary Examiner* — Matthew Bradley
*Assistant Examiner* — Daniel Tsui

(57) ABSTRACT

A method of performing disk operations on a physical storage that is being managed by a storage virtual appliance (SVA), from a virtual machine (VM), is disclosed. The method includes intercepting a data read/write request form the VM. The data read/write request is intercepted in the hypervisor prior to the read/write request reaches the SVA. The VM and the SVA are hosted in the hypervisor. The read/write request includes virtual block numbers which are translated into physical block numbers before performing the read/write operation on the physical storage. The method further includes probing a copy of virtual Logical Unit Number (LUN) block numbers to physical disk block numbers mapping table (bock map table) in the hypervisor to identify physical block numbers that corresponds to the virtual block numbers in the read/write request. If a mapping of the virtual block numbers in the read/write request is available in the hypervisor cache, the virtual block numbers are translated into the physical block numbers and the read/write request is performed directly to the physical storage totally bypassing the SVA.

19 Claims, 3 Drawing Sheets

BLOCK MAP BASED I/O OPTIMIZATION FOR STORAGE VIRTUAL APPLIANCES

RELATED APPLICATIONS AND CLAIMS OF PRIORITY

This application is a continuation in part of U.S. application Ser. No. 12/397,117 filed on Mar. 3, 2009, which is being incorporated herein by reference.

BACKGROUND

A Storage Virtual Appliance (SVA) is a special purpose virtual machine to manage shared storage in virtualized systems. A data transfer between a virtual machine and a SVA is performed through standard protocols as for example Network File System (NFS), Common Internet File System (CIFS), Internet Small Computer System Interface (iSCSI), etc.

There is a significant performance overhead, in terms of additional CPU cycles and latency, when compared to the traditional approach in which the storage virtualization service is provided directly by the hypervisor. Data copy to and from network buffers consumes a lot of CPU cycles when the hypervisor redirects the storage I/O (input-output) from a VM to a SVA using iSCSI or a similar TCP/IP based protocol. When writing data to storage, the VM sends the data to the hypervisor, which then copies it from the VM's memory onto the hypervisor network buffers and delivers the data over the virtual network to the SVA. The SVA network driver copies the data from the hypervisor buffers into the SVA's private buffers. The SVA again sends the same data to the hypervisor to be written to the physical disk. This involves one more level of copy. This makes sense if the SVA and VM were in two different physical hosts. However, if the SVA and the VM are co-resident, this adds unnecessary copies and delays in terms of context-switching (between the VM-hypervisor, hypervisor-SVA, SVA-hypervisor).

SUMMARY

In one embodiment, a method of performing disk operations on a physical storage that is being managed by a storage virtual appliance (SVA), from a virtual machine (VM), is disclosed. The method includes intercepting a data read/write request form the VM, the data read/write request is intercepted in the hypervisor prior to the read/write request reaches the SVA. The VM and the SVA are hosted in the hypervisor. The VM performs read/write operations on a virtual disk that is hosted by the SVA. The read/write request includes virtual block numbers which are translated into physical block numbers by the SVA before performing the read/write operation on the physical storage. The method further includes maintaining copy of virtual Logical Unit Number (LUN) block numbers to physical disk block numbers mapping/translation table (block map table) in the hypervisor to help identify physical block numbers that corresponds to the virtual block numbers in the read/write request totally bypassing the SVA. If a mapping of the virtual block numbers in the read/write request is available in the hypervisor cache, the virtual block numbers are translated into the physical block numbers and the read/write request is performed directly to the physical storage. Without the block map table, all operations would have to be routed through the SVA which will cause additional overhead.

In another embodiment, a system for transferring data from a virtual machine (VM) to a physical storage is disclosed. The system includes a virtual block device (VBD) coupled to the VM having a module to receive a copy of a virtual Logical Unit Number (LUN) block numbers to physical disk block numbers mapping table (block map table) and a storage virtual appliance (SVA) having a module to maintain the block map table. The SVA manages the physical storage and provide a transparent storage functionality to the VM in which the VM is unaware of actual physical disk in the physical storage being used for storage of data of the VM. The system also includes an interface between the VBD and the SVA to enable the SVA to transfer a copy of the block map table to the VBD.

In yet another embodiment, a computer readable media for storing programming instructions for performing disk operations on a physical storage that is being managed by a storage virtual appliance (SVA), from a virtual machine (VM) is disclosed. The computer readable media includes programming instructions for intercepting a data read/write request form the VM. The data read/write request is intercepted in the hypervisor prior to the data read/write request reaches the SVA. The VM and the SVA being hosted in the hypervisor in the same node. The data read/write request includes virtual block numbers which are translated into physical block numbers by the SVA before performing the read/write operation on the physical storage. The computer readable media further includes programming instructions for probing a copy of virtual Logical Unit Number (LUN) block numbers to physical disk block numbers mapping table (block map table) in the hypervisor to directly identify physical block numbers that corresponds to the virtual block numbers (issued by the VM) in the read/write request and programming instructions to determine if a mapping of the virtual block numbers in the read/write request are available in the hypervisor cache, programming instructions for translating the virtual block numbers into the physical block numbers and performing the data read/write request directly to the physical storage bypassing the SVA.

DETAILED DESCRIPTION

Figure 1:
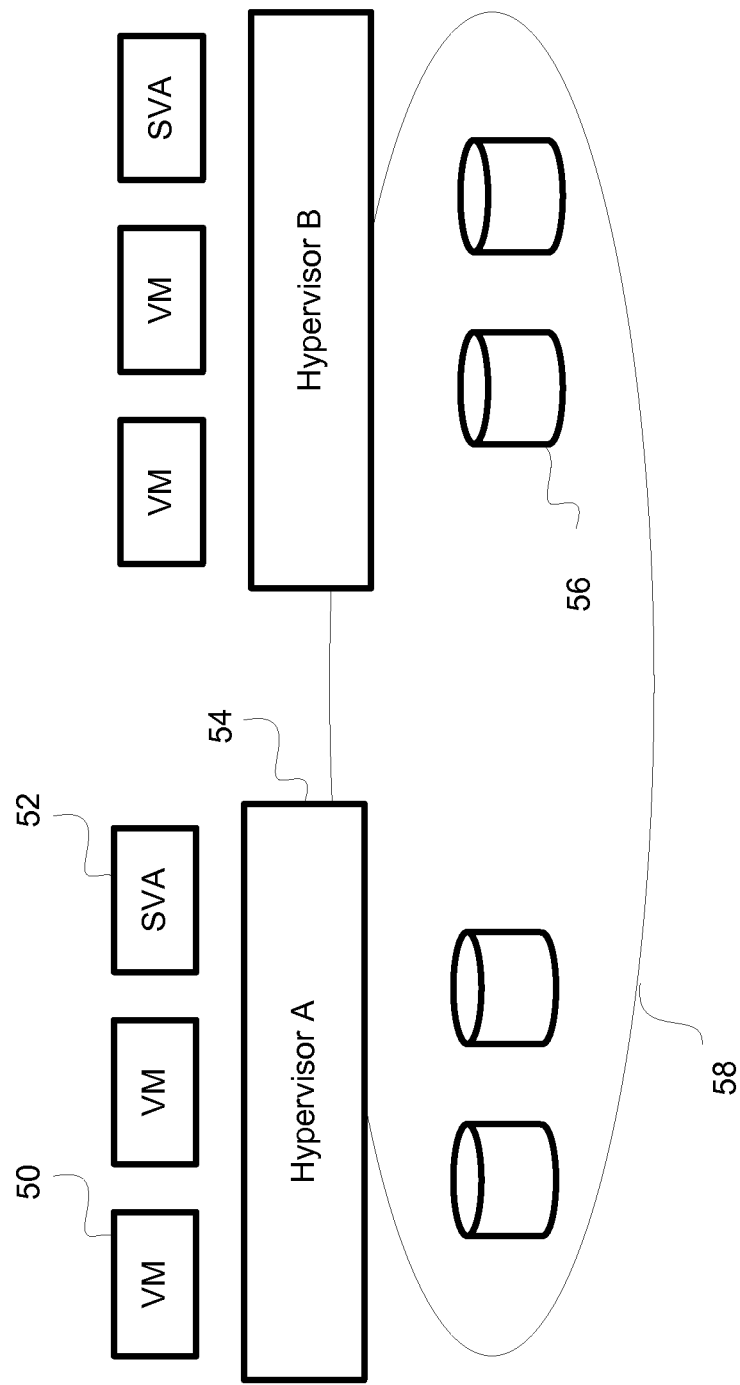
FIG. 1 illustrates a virtualized system including hypervisors, virtual machines and SVAs in accordance with one or more embodiments.

FIG. 1 illustrates a virtualized system, which includes one or more hypervisors 54 (e.g., VMware ESX™, Microsoft Hyper-V™, Citrix XenServer™, etc.). Each hypervisor 54 hosts one or more virtual machines (VM) 50 and at least one Storage Virtual Appliance (SVA) 52. Each hypervisor host includes Direct Attached Storage (DAS) 56. Direct Attached Storage refers to a digital storage system directly attached to a server or workstation, without a storage network in between.

A virtual appliance is a minimalist virtual machine image designed to run under a virtualization technology. Virtual appliances are a subset of the broader class of software appliances. A software appliance is a software application combined with a just enough operating system (JeOS) for it to run optimally on industry standard hardware (typically a server) or in a virtual machine. Like software appliances, virtual appliances are aimed to eliminate the installation, configuration and maintenance costs associated with running complex stacks of software. A key concept that differentiates a virtual appliance from a virtual machine is that a virtual appliance is a fully pre-installed and pre-configured application and operating system environment whereas a virtual machine is, by itself, without application software. A virtual appliance is usually built to host a single application.

Storage Virtual Appliances (SVAs) are special-purpose Virtual Machines (VMs) that enable shared-highly-available-storage functionality across hypervisor hosts. To provide a shared-highly-available-storage, SVAs enable transformation of DAS 56 into an iSCSI Storage Area Network (SAN) 58. SVAs across different hypervisor hosts work together in a clustered manner to provide shared and highly available storage without a need for commercially available SAN systems. Hence, the storage layer that is made up of DASs, in a virtualized system, is transformed into a shared storage layer. This shared storage layer can provide the data mirroring to enable fail proof operations of the virtual machines in the virtualized system. This shared storage layer also enables moving virtual machines from one hypervisor to another if a need arises due to, for example, hardware failure. A SVA, in one or more embodiment, allow access to this shared storage through block access protocols as for example iSCSI.

Figure 2:
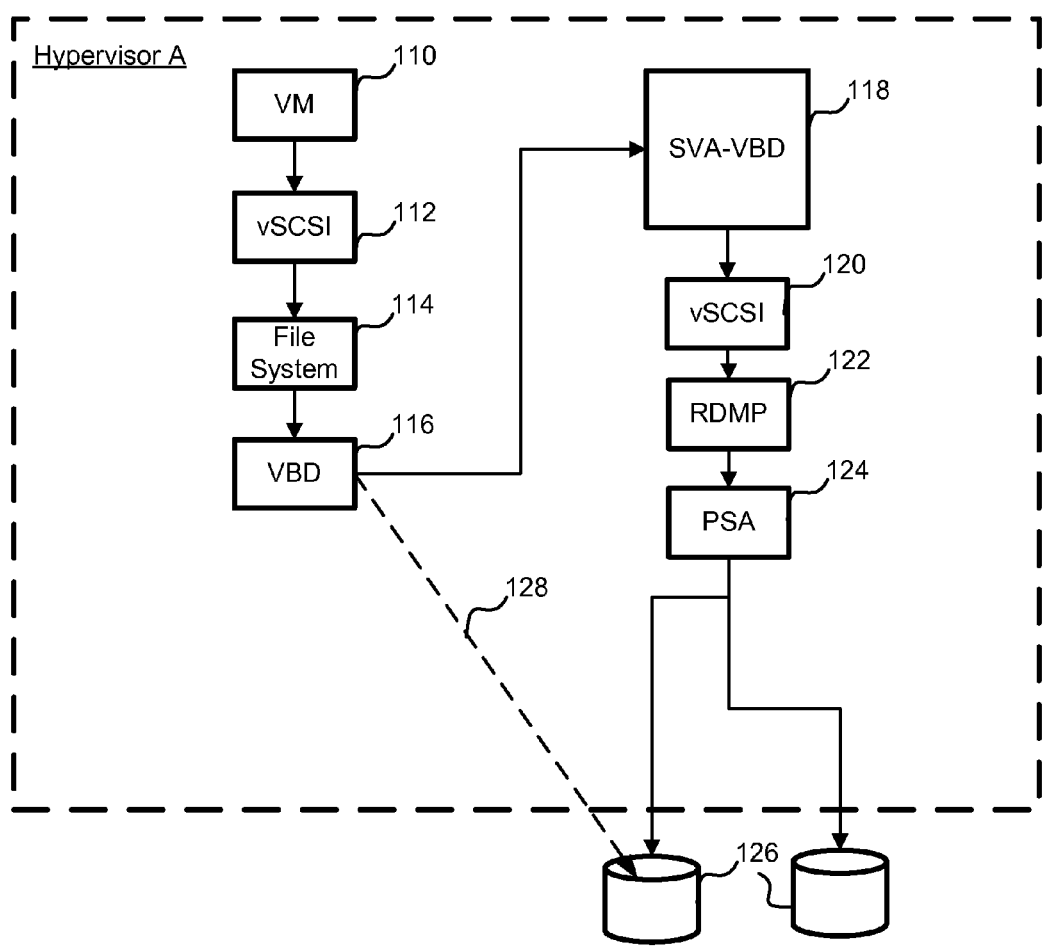
FIG. 2 illustrates a system for data transfer between a virtual machine and a SVA within a same hypervisor in accordance with one or more embodiments.

FIG. 2 illustrates a logical structure of a system for reading/writing data from/to a physical disk in a highly available storage. As noted above, SVAs provide transparent data storage to virtual machines. VM 110 uses a virtual SCSI 112 device to write/read data to/from VM's file system 114 (for example VMware VMFS™). File system 114 is coupled to a virtual block device (VBD) 116. To applications running in VM 110, this storage object (i.e., VBD 116) appears to be a physical block device attached to the VM. However, in fact, data is actually stored in a physical storage device 126 which may be isolated from VM 110 through one or more layers of abstraction. In the present embodiment, physical storage 126 to store the VM 110 data is managed by the SVA. Hence, in this embodiment, the SVA acts as an iSCSI target. In order to make physical storage transparent, VBD 116 uses virtual block numbers. VBD 116 then communicates with SVA-VBD 118, which translates virtual block numbers into physical block numbers and writes/read data to/from physical disks 126 through vSCSI 120, Raw Device Mapping Protocol (RDMP) 122 and Pluggable Storage Architecture (PSA) 124 layers. A vSCSI device is a virtualized SCSI device. The process of virtualizing devices and using these virtualized devices in virtual machines is a well known process; hence any further commentary on this process is being omitted.

Figure 3:
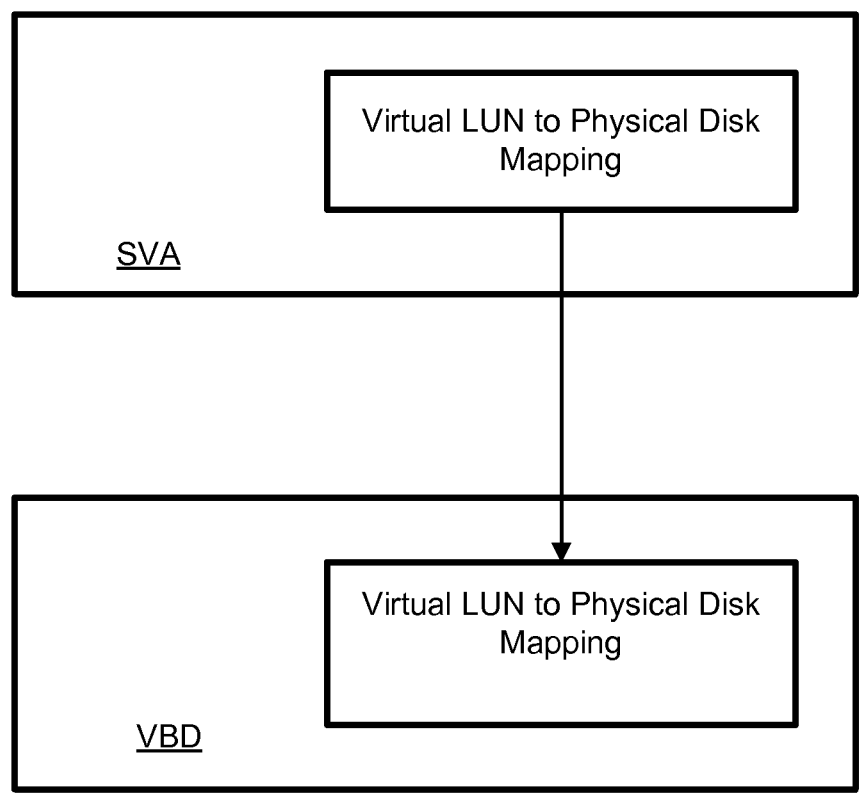
FIG. 3 illustrates a maintaining virtual to physical block mapping in accordance with one or more embodiments.

FIG. 3 illustrates a logical synching of virtual LUN to physical disk mapping data from a SVA to a VBD in a hypervisor. As mentioned above, to enable data storage transparency, a SVA maintains a local cache of a mapping between virtual blocks to physical blocks. When data is handed over to a SVA by a VM through various layers as depicted in FIG. 2, the SVA translates the block information from virtual to physical and writes the data in physical storage 126. When changes are made to physical storage 126, the SVA updates the virtual block to physical block mappings. However, since virtual machines are using only virtual blocks, no changes are needed to adjust virtual machine file systems to adjust to the updated physical storage.

In one or more embodiments, physical storage 126 is a collection of one or more physical disks. One or more such physical disks may be local to a virtual machine because these disks may be local to a hypervisor host that hosts the virtual machine. In this case, data storage can be made more efficient by connecting VBD 116 directly to physical storage 126, as illustrated by a direct link 128.

In one or more embodiments, SVA bypass can be implemented by maintaining a full or a partial copy of the virtual LUN to physical disk mappings in VBD 116. In one embodiment, to enable a SVA to provide VBD 116 with this mapping information, VBD 116 exposes an application programming interface (API). In one embodiment, the API includes the following functions:

sva_map_block (UUID vlun, INTEGER vblock, UUID plun, INTEGER pblock, INTEGER extent_size, BOOLEAN readonly)

sva_unmap_block (UUID vlun, INTEGER vblock)

A SVA invokes sva_map_block to provide a mapping for an extent of size "extent_size" blocks starting at block "vblock" inside a virtual LUN with an UUID "vlun" to a physical block "pblock" inside a physical LUN with UUID "plun". The read only flag indicates whether the translation is valid for only read requests or for both read as well as write requests. Similarly, sva_unmap_block function is invoked by a SVA to remove or invalidate the block mapping starting at block number "vblock" from the virtual LUN with UUID "vlun." In one embodiment, the vmkernel provides implementation of this API. The vmkernel is a well known component of a hypervisor system, hence details of vmkernel are being omitted. It should be noted that this function calls are provided as an example. A person skilled in the art would realize that these functions may be shaped differently without diverting from the broader underlying functionality being provided by the API.

It is a joint responsibility of a SVA and a hypervisor (which provides VBD module, in one embodiment) to maintain coherency of the block mapping cache. However, in one or more embodiments, VBD 116 may decide not to use the mapping information provided by the SVA and send all read/write requests to the SVA. Alternatively, if VBD 116 does not find the mapping information for a particular vlun block in the local cache, the read/write request is sent to the SVA and when the mapping information is available, the SVA is bypassed. In some cases, the mapping information in the local cache of VBD 116 may be outdated and the read/write operation performed using this outdated cache may fail. In such cases, the failed request is sent to the SVA after failure occurs. In one embodiment, when a failure occurs, VBD 116 flushes the local mapping cache and requests the SVA to refresh the mapping information.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention (s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

The invention claim is:

1. A method of performing disk operations on a physical storage that is being managed by a storage virtual appliance (SVA) from a virtual machine (VM), the method comprising:
   intercepting a request for reading or writing data from the VM, the request being intercepted in a hypervisor prior to the request reaching the SVA, the VM and the SVA being hosted in the hypervisor, wherein the request includes virtual block numbers that are translated into physical block numbers before performing an operation to read or write data with the physical storage;
   storing a mapping table including a copy of virtual block numbers to physical block numbers in the hypervisor;
   probing, by the hypervisor, the copy of virtual block numbers to physical block numbers in the mapping table in the hypervisor to identify if a mapping of physical block numbers that correspond to the virtual block numbers of the request is available to determine if a bypass of the SVA should be performed; and
   if the bypass of the SVA should be performed, translating, by the hypervisor, the virtual block numbers into the physical block numbers and performing, by the hypervisor, the request directly to the physical storage without using the SVA; and
   if the bypass of the SVA should not be performed, sending the request to the SVA, wherein the SVA is configured to identify physical block numbers that correspond to the virtual block numbers in the request and perform the request using the physical block numbers with the physical storage.

2. The method as recited in claim 1, wherein the mapping table in the hypervisor comprises a first mapping table, the method further comprising:
   maintaining the a second mapping table in the SVA, wherein the SVA manages the physical storage and provides a transparent storage functionality to the VM in which the VM is unaware of an actual physical disk in the physical storage being used for storage of data of the VM; and
   making a copy of the second mapping table to form the first mapping table in the hypervisor that hosts the VM and the SVA, wherein the first mapping table in the hypervisor is kept in sync with the second mapping table in the SVA.

3. The method as recited in claim 2, wherein making the copy of the second mapping table is performed through an application programming interface (API) provided by the hypervisor, and the API includes functions to map and upmap virtual block numbers to physical block numbers.

4. The method as recited in claim 1, wherein determining if the bypass of the SVA should be performed comprises determining if a flag is set to bypass the SVA, wherein the flag is set when the request is for readonly purposes only.

5. The method as recited in claim 1, wherein if the bypass of the SVA is performed and results in an error, sending the request to the SVA.

6. The method as recited in claim 1, further comprising flushing the mapping table in the hypervisor when an error occurs when performing the request directly to the physical storage without using the SVA.

7. The method of claim 1, further comprising:
   receiving the mapping table at the hypervisor from the SVA, wherein the received mapping table is stored in the hypervisor.

8. A non-transitory computer readable storage medium for storing programming instructions for performing disk operations on a physical storage that is being managed by a storage virtual appliance (SVA) from a virtual machine (VM), the computer readable media comprising:
   programming instructions for intercepting a request for reading or writing data from the VM, the request being intercepted in a hypervisor prior to the request reaching the SVA, the VM and the SVA being hosted in the hypervisor, wherein the request includes virtual block numbers that are translated into physical block numbers before performing an operation to read or write data with the physical storage;
   programming instructions for storing a mapping table including a copy of virtual block numbers to physical block numbers in the hypervisor;
      programming instructions for probing, by the hypervisor, the copy of virtual block numbers to physical block numbers in the mapping table in the hypervisor to identify if a mapping of physical block numbers that correspond to the virtual block numbers of the request is available to determine if a bypass of the SVA should be performed; and
      programming instructions for if the bypass of the SVA should be performed, translating, by the hypervisor, the virtual block numbers into the physical block numbers and performing, by the hypervisor, the request directly to the physical storage without using the SVA; and
   if the bypass of the SVA should not be performed, programming instructions for sending the request to the SVA, wherein the SVA is configured to identify physical block numbers that correspond to the virtual block numbers in the request and perform the request using the physical block numbers with the physical storage.

9. The non-transitory computer readable storage medium as recited in claim 8, wherein the mapping table in the hypervisor comprises a first mapping table, further comprising:
   programming instructions for maintaining the a second mapping table in the SVA, wherein the SVA manages the physical storage and provides a transparent storage functionality to the VM in which the VM is unaware of an actual physical disk in the physical storage being used for storage of data of the VM; and
   programming instructions for making a copy of the second mapping table to form the first mapping table in the hypervisor that hosts the VM and the SVA, wherein the first mapping table in the hypervisor is kept in sync with the second mapping table in the SVA.

10. The non-transitory computer readable storage medium as recited in claim 9, wherein making the copy of the second mapping table is performed through an application programming interface (API) provided by the hypervisor, and the API includes functions to map and upmap virtual block numbers to physical block numbers.

11. The non-transitory computer readable storage medium as recited in claim 8, wherein programming instructions for determining if the bypass of the SVA should be performed comprise programming instructions for determining if a flag is set to bypass the SVA, wherein the flag is set when the request is for readonly purposes only.

12. The non-transitory computer readable storage medium as recited in claim 8, wherein if the bypass of the SVA is performed and results in an error, programming instructions for sending the request to the SVA.

13. The non-transitory computer readable storage medium as recited in claim 8, further comprising flushing the mapping table in the hypervisor when an error occurs when performing the request directly to the physical storage without using the SVA.

14. An apparatus configured to store programming instructions for performing disk operations on a physical storage that is being managed by a storage virtual appliance (SVA) from a virtual machine (VM), apparatus comprising:
   one or more computer processors; and
   a computer-readable storage medium comprising instructions for controlling the one or more computer processors to be operable for:
      intercepting a request for reading or writing data from the VM, the request being intercepted in a hypervisor prior to the request reaching the SVA, the VM and the SVA being hosted in the hypervisor, wherein the request includes virtual block numbers that are translated into physical block numbers before performing an operation to read or write data with the physical storage;
      storing a mapping table including a copy of virtual block numbers to physical block numbers in the hypervisor;
      probing, by the hypervisor, the copy of virtual block numbers to physical block numbers in the mapping table in the hypervisor to identify if a mapping of physical block numbers that correspond to the virtual block numbers of the request is available to determine if a bypass of the SVA should be performed; and
      if the bypass of the SVA should be performed, translating, by the hypervisor, the virtual block numbers into the physical block numbers and performing, by the hypervisor, the request directly to the physical storage without using the SVA; and
   if the bypass of the SVA should not be performed, sending the request to the SVA, wherein the SVA is configured to identify physical block numbers that correspond to the virtual block numbers in the request and perform the request using the physical block numbers with the physical storage.

15. The apparatus as recited in claim 14, wherein the mapping table in the hypervisor comprises a first mapping table, further operable for:
   maintaining the a second mapping table in the SVA, wherein the SVA manages the physical storage and provides a transparent storage functionality to the VM in which the VM is unaware of actual physical disk in the physical storage being used for storage of data of the VM; and
   making a copy of the second mapping table to form the first mapping table in the hypervisor that hosts the VM and the SVA, wherein the first mapping table in the hypervisor is kept in sync with the second mapping table in the SVA.

16. The apparatus as recited in claim 15, wherein making the copy of the second block table is performed through an application programming interface (API) provided by the hypervisor, and the API includes functions to map and upmap virtual block numbers to physical block numbers.

17. The apparatus as recited in claim 14, wherein determining if the bypass of the SVA should be performed comprises determining if a flag is set to bypass the SVA, wherein the flag is set when the request is for readonly purposes only.

18. The apparatus as recited in claim 14, wherein if the bypass of the SVA is performed and results in an error, further operable for sending the request to the SVA.

19. The apparatus as recited in claim 14, further operable for flushing the mapping table in the hypervisor when an error occurs when performing the request directly to the physical storage without using the SVA.

\* \* \* \* \*